(12) United States Patent
Sano et al.

(10) Patent No.: US 7,871,467 B2
(45) Date of Patent: *Jan. 18, 2011

(54) INK SET FOR INK JET RECORDING AND METHOD FOR INK JET RECORDING

(75) Inventors: Tsuyoshi Sano, Shiojiri (JP); Kiyohiko Takemoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/317,766

(22) Filed: Dec. 29, 2008

(65) Prior Publication Data

US 2009/0169834 A1 Jul. 2, 2009

(30) Foreign Application Priority Data

Dec. 28, 2007 (JP) .............................. 2007-340510
Jun. 30, 2008 (JP) .............................. 2008-171305

(51) Int. Cl.
*C09D 11/02* (2006.01)
*B41J 2/01* (2006.01)

(52) U.S. Cl. ..................................... 106/31.6; 347/100

(58) Field of Classification Search ................ 106/31.6; 347/100

See application file for complete search history.

(56) References Cited

U.S. PATENT DOCUMENTS

| 5,690,723 | A | * | 11/1997 | Sano et al. ................. 106/31.6 |
| 5,846,306 | A | * | 12/1998 | Kubota et al. .............. 106/31.6 |
| 6,030,441 | A | * | 2/2000 | Kubota et al. ............. 106/31.75 |
| 6,395,079 | B1 | * | 5/2002 | Sano ........................ 106/31.59 |
| 6,419,733 | B1 | * | 7/2002 | Sano et al. ................ 106/31.86 |
| 6,488,751 | B1 | * | 12/2002 | Takemoto .................. 106/31.6 |
| 6,755,514 | B2 | | 6/2004 | Koga |
| 6,849,110 | B2 | * | 2/2005 | Sano ........................ 106/31.6 |
| 7,063,409 | B2 | | 6/2006 | Koga |
| 7,285,592 | B2 | | 10/2007 | Harz et al. |
| 7,604,693 | B2 | * | 10/2009 | Oyanagi et al. ............ 106/31.6 |
| 2003/0144377 | A1 | * | 7/2003 | Sano et al. ................. 523/160 |
| 2006/0229382 | A1 | | 10/2006 | Schweikari et al. |
| 2006/0268084 | A1 | | 11/2006 | Nishizaki et al. |
| 2007/0022547 | A1 | | 2/2007 | O'Brien |
| 2007/0120926 | A1 | | 5/2007 | Doumaux et al. |
| 2008/0182083 | A1 | * | 7/2008 | Oyanagi et al. ........... 428/195.1 |
| 2008/0233362 | A1 | * | 9/2008 | Kato et al. ................. 106/31.6 |
| 2009/0142555 | A1 | * | 6/2009 | Sano et al. ................ 428/195.1 |

FOREIGN PATENT DOCUMENTS

| CN | 1398724 A1 | 10/2000 |
| CN | 1529740 A | 9/2004 |
| CN | 1771307 A | 5/2006 |
| EP | 1045013 A1 | 10/2000 |
| EP | 1422072 A1 | 5/2004 |
| EP | 1892105 A1 | 2/2008 |
| GB | 2367299 A | 4/2002 |
| JP | 62-001426 | 1/1987 |
| JP | 03-056573 | 3/1991 |
| JP | 03-079678 | 4/1991 |
| JP | 03-160068 | 7/1991 |
| JP | 04-018462 | 1/1992 |
| JP | 10-120956 | 5/1998 |
| JP | 2000-345080 | 12/2000 |
| JP | 2006-283017 | 10/2006 |
| WO | WO-99-05230 A | 2/1999 |

* cited by examiner

*Primary Examiner*—Helene Klemanski
(74) *Attorney, Agent, or Firm*—Nutter McClennen & Fish LLP; John J. Penny, Jr.

(57) ABSTRACT

Disclosed is a five-color ink set for ink jet recording, which can realize good images excellent in lightfastness and waterfastness, as well as particularly in hue. The five-color ink set for ink jet recording comprises a cyan ink composition, a magenta ink composition, a yellow ink composition, a green ink composition and an orange ink composition, wherein the cyan ink composition comprises C.I. Pigment Blue 15:3 or C.I. Pigment Blue 15:4, the magenta ink composition comprises C.I. Pigment Red 122, C.I. Pigment Red 202, C.I. Pigment Red 209 or C.I. Pigment Violet 19, the yellow ink composition comprises C.I. Pigment Yellow 213, the green ink composition comprises C.I. Pigment Green 7 or C.I. Pigment Green 36, and the orange ink composition comprises C.I. Pigment Orange 64, C.I. Pigment Orange 43 or C.I. Pigment Orange 71.

6 Claims, No Drawings

INK SET FOR INK JET RECORDING AND METHOD FOR INK JET RECORDING

BACKGROUND OF THE INVENTION

1. Field of Invention

The present invention relates to an ink set for ink jet recording, comprising a cyan ink composition, a yellow ink composition, a magenta ink composition, a green ink composition and an orange ink composition.

2. Background Art

Ink jet recording is a printing method wherein droplets of an ink composition are flied and deposited on recording media such as paper to perform printing. This method has a feature that high-resolution and high-quality images can be printed at a high speed with a relatively inexpensive apparatus.

Ink compositions for use in ink jet recording generally comprise water as a main component, and a colorant component and a wetting agent such as glycerin, for example, for clogging preventive purposes, added to the water. Water soluble dyes have hitherto been extensively used as the colorant for the ink composition for ink jet recording, for example, from the viewpoints of their high level of chroma, their abundance of usable types, and their solubility in water.

On the other hand, dyes are sometimes poor in various properties such as lightfastness and waterfastness. Accordingly, printed matters printed using dye-based ink compositions have poor lightfastness and waterfastness. While the waterfastness has been improved by using ink jet specialty recording paper comprising an ink absorptive layer, the waterfastness of printed matter on plain paper has room for improvement.

Pigments are superior in lightfastness and waterfastness to dyes, and studies have recently been made on the utilization of pigments as a colorant for an ink composition for ink jet recording, from the viewpoint of improving the lightfastness and waterfastness. Pigments are generally insoluble in water. Accordingly, when pigments are used in a water-based ink composition, prior to the preparation of an ink composition, the step of mixing the pigment with a resin called a dispersant and the like and adding the mixture to water to stably disperse the mixture in water should be provided.

Further, for the use of pigments as a colorant for inks for ink jet recording, pigments are superior in lightfastness and waterfastness to dyes, but on the other hand, the number of types of usable coloring materials in the pigments is smaller than the number of types of usable coloring materials in the dyes. When pigments are practically utilized in an ink for ink jet recording, in addition to lightfastness and waterfastness, hue should also be satisfactorily studied. For example, Japanese Patent Laid-Open No. 345080/2000 proposes a yellow ink composition comprising a combination of a specific pigment having excellent lightfastness and two specific pigments having excellent color development. Further, Japanese Patent Laid-Open No. 120956/1998 proposes an ink set comprising a combination of specific pigment-containing cyan, magenta and yellow ink compositions, which ink set can realize good images excellent in lightfastness and waterfastness, as well as particularly in hue.

Further, WO1999/005230 proposes an ink set comprising a combination of a cyan ink composition, a magenta ink composition, a yellow ink composition and a black ink composition and, further, an orange ink composition and a green ink composition. The claimed advantage of the ink is that good images excellent in lightfastness and waterfastness, as well as particularly in hue, can be realized.

Japanese Patent Laid-Open No. 283017/2006 discloses that the color development and color reproduction range, particularly color reproduction of a red region, can be expanded by forming images using an ink set comprising a first ink having a maximum absorption wavelength in a range of not less than 450 nm and less than 500 nm and a second ink having a maximum absorption wavelength in a range of not less than 500 nm and not more than 570 nm, the ink set satisfying a requirement represented by formula B/A=not less than 0.7 and not more than 1.0, wherein A represents the maximum absorbance of the total absorbance of the first ink and the second ink in the wavelength range of not less than 450 nm and not more than 570 nm; and B represents the minimum absorbance of the total absorbance of the first ink and the second ink in the wavelength range of not less than 450 nm and not more than 570 nm. The above publication further describes that images having good gradations can be formed.

SUMMARY OF THE INVENTION

The present inventors have now found that, for a method of color ink jet recording, an ink set comprising a combination of specific pigment-containing yellow ink composition, magenta ink composition, cyan ink composition, green ink composition and orange ink composition can realize good images excellent in lightfastness and waterfastness, as well as particularly in hue, without the need to use a plurality of pigments as a yellow ink pigment. The present invention has been made based on such finding.

Accordingly, an object of the present invention is to provide an ink set for ink jet recording, which can realize good images excellent in lightfastness and waterfastness, as well as particularly in hue.

According to the present invention, there is provided an ink set for ink jet recording, comprising a cyan ink composition, a magenta ink composition, a yellow ink composition, a green ink composition and an orange ink composition, wherein the cyan ink composition comprises as a colorant at least one pigment selected from the group consisting of C.I. Pigment Blue 15:3 and C.I. Pigment Blue 15:4, the magenta ink composition comprises as a colorant at least one pigment selected from the group consisting of C.I. Pigment Red 122, C.I. Pigment Red 202, C.I. Pigment Red 209 and C.I. Pigment Violet 19, the yellow ink composition comprises as a colorant C.I. Pigment Yellow 213, the green ink composition comprises as a colorant at least one pigment selected from the group consisting of C.I. Pigment Green 7 and C.I. Pigment Green 36, and the orange ink composition comprises as a colorant at least one pigment selected from the group consisting of C.I. Pigment Orange 64, C.I. Pigment Orange 43, and C.I. Pigment Orange 71.

According to another aspect of the present invention, there is provided a method for ink jet recoding, comprising the step of ejecting droplets of an ink composition and depositing the droplets onto a recording medium to perform printing, wherein at least one ink composition contained in the above ink set is used.

According to the present invention, good images excellent in lightfastness and waterfastness, as well as particularly in hue can be realized.

DETAILED DESCRIPTION OF THE INVENTION

The ink set according to the present invention comprises a cyan ink composition, a magenta ink composition, a yellow ink composition, a green ink composition and an orange ink composition and each of these ink compositions contains a specific pigment as a colorant. Each ink composition constituting the ink set according to the present invention will be described.

Yellow Ink Composition

The yellow ink composition for the ink set according to the present invention contains C.I. Pigment Yellow 213 as a colorant. The use of this yellow pigment-containing yellow ink composition in combination with a magenta ink composition, a cyan ink composition, a green ink composition and an orange ink composition which will be described later, can realize good images excellent in lightfastness and waterfastness, as well as particularly in hue.

In particular, it should be noted that, according to the present invention, images excellent in lightfastness and waterfastness, as well as particularly in hue, can be yielded by merely using a yellow ink composition containing only C.I. Pigment Yellow 213 as a yellow pigment without use of a plurality of yellow pigments, for example, without use of a combination of a yellow pigment having excellent lightfastness (for example, C.I. Pigment Yellow 128 or C.I. Pigment Yellow 110) with a yellow pigment having excellent color development (for example, C.I. Pigment Yellow 74). This is surprising and an advantage of the present invention. Further, since there is no need to use a yellow ink composition containing a plurality of pigments, the present invention is also advantageous in that the preparation of an ink composition and the practice of ink jet recording are simple.

The yellow ink composition used in the present invention comprises at least water together with the above pigment. The amount of the pigment added to the ink composition may be properly determined in such an amount range that can realize good images excellent in lightfastness and waterfastness, as well as in hue. Preferably, however, the addition amount of the pigment is, for example, not more than 6% by weight.

The above pigment is preferably added, to an ink composition, as a pigment dispersion liquid produced by dispersing the pigment in an aqueous medium with the aid of a dispersant or a surfactant. Preferred dispersants include dispersants which have been commonly used for the preparation of pigment dispersion liquids, for example, polymeric dispersants.

Examples of preferred polymeric dispersants include synthetic polymers. Examples of such synthetic polymers include: polyvinyl alcohols; polyvinyl pyrrolidones; acrylic resins such as polyacrylic acid, acrylic acid/acrylonitrile copolymer, potassium acrylate/acrylonitrile copolymer, vinyl acetate/acrylic ester copolymer and acrylic acid/acrylic ester copolymer; styrene/acrylic resins such as styrene/acrylic acid copolymer, styrene/methacrylic acid copolymer, styrene/methacrylic acid/acrylic ester copolymer, styrene/α-methylstyrene/acrylic acid copolymer and styrene/α-methylstyrene/acrylic acid/acrylic ester copolymer; styrene/maleic acid copolymer; styrene/maleic anhydride copolymer; vinylnaphthalene/acrylic acid copolymer; vinylnaphthalene/maleic acid copolymer; vinyl acetate copolymers such as vinyl acetate/ethylene copolymer, vinyl acetate/fatty acid vinyl/ethylene copolymer, vinyl acetate/maleic ester copolymer, vinyl acetate/crotonic acid copolymer, and vinyl acetate/acrylic acid copolymer; and salts of the above polymers. Among them, a copolymer of a monomer having a hydrophobic group with a monomer having a hydrophilic group and a polymer of a monomer having both a hydrophobic group and a hydrophilic group in its molecular structure, for example, styrene/acrylic acid copolymer or its salts, are particularly preferred.

In a preferred embodiment of the present invention, the yellow ink composition comprises an organic solvent. The organic solvent is preferably a low-boiling organic solvent, and preferred examples thereof include methanol, ethanol, n-propyl alcohol, iso-propyl alcohol, n-butanol, sec-butanol, tert-butanol, iso-butanol and n-pentanol. Monohydric alcohols are particularly preferred. The low-boiling organic solvent has the effect of shortening the time necessary for drying the ink composition.

In a preferred embodiment of the present invention, the ink composition used in the present invention preferably further comprises a high-boiling organic solvent. Examples of preferred high-boiling organic solvents include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane and trimethylolpropane; alkyl ethers of polyhydric alcohols, for example, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether and triethylene glycol monobutyl ether; urea; 2-pyrrolidone; N-methyl-2-pyrrolidone; 1,3-dimethyl-2-imidazolidinone and triethanolamine.

The amount of the low-boiling organic solvent added is preferably 0.5 to 10% by weight, more preferably 1.5 to 6% by weight, based on the ink composition. The amount of the high-boiling organic solvent added is preferably 0.5 to 40% by weight, more preferably 2 to 20% by weight, based on the ink composition.

In a preferred embodiment of the present invention, the yellow ink composition according to the present invention may comprise a surfactant. Preferred surfactants include, for example, anionic surfactants (for example, sodium dodecylbenzenesulfonate, sodium laurylate and ammonium salts of polyoxyethylene alkyl ether sulfates) and nonionic surfactants (for example, polyoxyethylene alkyl ethers, polyoxyethylene alkyl esters, polyoxyethylene sorbitan fatty acid esters, polyoxyethylene alkylphenyl ethers, polyoxyethyleneakylamines and polyoxyethylenealkylamides). They may be used either solely or as a mixture of two or more. Further, acetylene glycols (OLFINEY, Surfynol 82, Surfynol 104, Surfynol 440, Surfynol 465 and Surfynol 485 (all the above products being manufactured by Air Products and Chemicals Inc.) may also be used.

Examples of additional preferred surfactants include commercially available silicone surfactants BYK-347 and BYK-348 (both the above products being manufactured by BYK Japan K.K.).

If necessary, other additives such as pH adjustors, preservatives and antimolds may be added.

Magenta Ink Composition

The magenta ink composition for the ink set according to the present invention comprises as a colorant at least one pigment selected from the group consisting of C.I. Pigment Red 122, C.I. Pigment Red 202, C.I. Pigment Red 209 and C.I. Pigment Violet 19. A magenta ink composition comprising C.I. Pigment Red 122 among these pigments is particularly preferred. The use of a combination of the magenta ink composition comprising the specific magenta pigment with the above yellow ink composition, and a cyan ink composition, a green ink composition and an orange ink composition, which will be described later, can realize good images excellent in lightfastness and waterfastness, as well as particularly in hue.

The magenta ink composition constituting the ink set in the present invention comprises at least water together with the above pigment. The amount of the pigment added to the ink composition may be properly determined in such an amount range that can realize good images excellent in lightfastness and waterfastness, as well as in hue. Preferably, however, the addition amount of the pigment is, for example, not more than 6% by weight.

As with the yellow ink composition, the magenta ink composition is preferably added, to the ink composition, as a pigment dispersion liquid produced by dispersing the pigment in an aqueous medium with the aid of a dispersant or a surfactant. Preferred dispersants include dispersants which have been commonly used for the preparation of pigment dispersion liquids, for example, polymeric dispersants.

As with the yellow ink composition, the magenta ink composition according to the present invention preferably contains, for example, organic solvents, surfactants, pH adjustors, a preservatives and an antimolds. Specific examples and the addition amount thereof may be the same as those in the yellow ink composition.

Cyan Ink Composition

The cyan ink composition for the ink set according to the present invention comprises as a colorant at least one pigment selected from the group consisting of C.I. Pigment Blue 15:3 and C.I. Pigment Blue 15:4. A cyan ink composition comprising C.I. Pigment Blue 15:4 among these pigments is particularly preferred. The use of a combination of the cyan ink composition comprising the specific cyan pigment with the above yellow ink composition, the above magenta ink composition, and a green ink composition and an orange ink composition, which will be described later, can realize good images excellent in lightfastness and waterfastness, as well as particularly in hue.

The cyan ink composition constituting the ink set in the present invention comprises at least water together with the above pigment. The amount of the pigment added to the ink composition may be properly determined in such an amount range that can realize good images excellent in lightfastness and waterfastness, as well as in hue. Preferably, however, the addition amount of the pigment is, for example, not more than 6% by weight.

As with the yellow ink composition, the cyan ink composition is preferably added, to the ink composition, as a pigment dispersion liquid produced by dispersing the pigment in an aqueous medium with the aid of a dispersant or a surfactant. Preferred dispersants include dispersants which have been commonly used for the preparation of pigment dispersion liquids, for example, polymeric dispersants.

As with the yellow ink composition, the cyan ink composition according to the present invention preferably contains, for example, organic solvents, surfactants, pH adjustors, preservatives and antimolds. Specific examples and the addition amount thereof may be the same as those in the yellow ink composition.

Green Ink Composition

The green ink composition for the ink set according to the present invention comprises as a colorant at least one pigment selected from the group consisting of C.I. Pigment Green 7 and C.I. Pigment Green 36. A green ink composition comprising C.I. Pigment Green 36 among these pigments is particularly preferred. The use of a combination of the green ink composition comprising the specific green pigment with the above yellow ink composition, the above magenta ink composition, the above cyan ink composition and an orange ink composition, which will be described later, can realize good images excellent in lightfastness and waterfastness, as well as particularly in hue.

The green ink composition constituting the ink set in the present invention comprises at least water together with the above pigment. The amount of the pigment added to the ink composition may be properly determined in such an amount range that can realize good images excellent in lightfastness and waterfastness, as well as in hue. Preferably, however, the addition amount of the pigment is, for example, not more than 6% by weight.

As with the yellow ink composition, the green ink composition is preferably added, to the ink composition, as a pigment dispersion liquid produced by dispersing the pigment in an aqueous medium with the aid of a dispersant or a surfactant. Preferred dispersants include dispersants which have been commonly used for the preparation of pigment dispersion liquids, for example, polymeric dispersants.

As with the yellow ink composition, the green ink composition according to the present invention preferably contains, for example, organic solvents, surfactants, pH adjustors, preservatives and antimolds. Specific examples and the addition amount thereof may be the same as those in the yellow ink composition.

Orange Ink Composition

The orange ink composition for the ink set according to the present invention comprises as a colorant at least one pigment selected from the group consisting of C.I. Pigment Orange 64, C.I. Pigment Orange 43 and C.I. Pigment Orange 71. An orange ink composition comprising C.I. Pigment Orange 64 among these pigments is particularly preferred. The use of a combination of the orange ink composition comprising the specific orange pigment with the above yellow ink composition, the above magenta ink composition, the above cyan ink composition and the above green ink composition can realize good images excellent in lightfastness and waterfastness, as well as particularly in hue.

The orange ink composition constituting the ink set in the present invention comprises at least water together with the above pigment. The amount of the pigment added to the ink composition may be properly determined in such an amount range that can realize good images excellent in lightfastness and waterfastness, as well as in hue. Preferably, however, the addition amount of the pigment is, for example, not more than 6% by weight.

As with the yellow ink composition, the orange ink composition is preferably added, to the ink composition, as a pigment dispersion liquid produced by dispersing the pigment in an aqueous medium with the aid of a dispersant or a surfactant. Preferred dispersants include dispersants which have been commonly used for the preparation of pigment dispersion liquids, for example, polymeric dispersants.

As with the yellow ink composition, the orange ink composition according to the present invention preferably contains, for example, organic solvents, surfactants, pH adjustors, preservatives and antimolds. Specific examples and the addition amount thereof may be the same as those in the yellow ink composition.

Ink Set

The ink set according the present invention comprises the above ink compositions. In the present invention, preferably, the concentration of the cyan pigment in the cyan ink composition and the concentration of the magenta pigment in the magenta ink composition are lower than the concentration of the yellow pigment in the yellow ink composition. The color reproduction of images can be further improved by bringing the concentration of the cyan pigment and the concentration of the magenta pigment to a smaller value than the concentration of the yellow pigment.

Further, in the present invention, preferably, the concentration of the magenta pigment in the magenta ink composition is larger than the concentration of the cyan pigment in the cyan ink composition and the concentration of the yellow pigment in the yellow ink composition is larger than the concentration of the magenta pigment in the magenta ink composition. When the yellow ink composition, the magenta ink composition, the orange or green ink composition and the cyan ink composition have the highest pigment concentration, the second highest pigment concentration, the third highest pigment concentration and the lowest pigment concentration, respectively, better color reproduction can be realized.

In a preferred embodiment of the present invention, in the ink set according to the present invention, the concentration of the pigment in all the ink compositions is not more than 6% by weight, and the ratio among the concentration (% by weight) of the pigment in the cyan ink composition, the concentration (% by weight) of the pigment in the magenta ink composition, the concentration (% by weight) of the pigment in the yellow ink composition, the concentration (% by weight) of the pigment in the green ink composition and the concentration (% by weight) of the pigment in the orange ink composition is preferably pigment concentration of cyan ink composition:pigment concentration of magenta ink composition:pigment concentration of yellow ink composition:pigment concentration of green ink composition:pigment concentration of orange ink composition=2.0 to 5.0:2.5 to 5.5:3.5 to 6.0:2.0 to 5.0:2.0 to 5.0, more preferably 2.5 to 5.0:3.5 to 5.5:4.0 to 6.0:2.0 to 5.0:2.0 to 5.0. According to this embodiment, images having a further improved hue can be realized.

The ink set according to the present invention may be an ink set for color recording, comprising the above-described individual ink compositions and other additional ink composition(s). In this case, so far as the effect of the present invention as an ink set is not sacrificed, for example, the type of the additional ink compositions is not particularly limited, and ink compositions commonly used for conventional ink jet recording may be used as the additional ink composition.

Other color ink compositions, which may be included in the ink set, include light cyan, light magenta, dark yellow, red, blue and violet ink compositions. The "light magenta" ink composition and the "light cyan" ink composition are respectively magenta ink composition and cyan ink composition each of which the colorant concentration has been lowered generally from the viewpoint of improving the quality of printed images by density modulation. The "dark yellow" ink composition is a yellow ink composition which uses a colorant (a pigment) having lower lightness and chroma than the yellow ink composition from the viewpoint of improving the color reproduction of a dark color, for example, in a shadow part. The "red", "blue" and "violet" ink compositions are ink compositions used as respective elements for constituting intermediate colors of yellow, magenta and cyan from the viewpoint of improving the color reproduction range.

The ink set according to the present invention may be constituted in the same manner as in the conventional ink set and may be utilized as inks in various conventional recording methods. In particular, in the present invention, high-resolution and high-quality images can be printed at a high speed with a relatively inexpensive apparatus. Accordingly, the ink set according to the present invention is suitable for ink jet recording, that is, for applications where ink droplets are flied and deposited on recording media such as paper to perform printing.

Method for Ink Jet Recording

The method for ink jet recording using the ink set according to the present invention comprises ejecting droplets of the ink composition and depositing the droplets onto a heated recording medium to perform printing. Examples of methods for ejecting droplets of each ink composition include a method wherein an electric signal is converted to a mechanical signal using an electrostrictive element to intermittently eject ink reservoired in a nozzle head section, thereby recording letters or symbols on the surface of a recording medium, and a method wherein ink, reservoired in a nozzle head section, in its portion very close to the ejection portion is rapidly heated to create bubbles and the ink is intermittently ejected by volume expansion created by the bubbles to record letters or symbols on the surface of a recording medium. In a preferred embodiment of the present invention, the ink set is used in the ink jet recoding method using an electrostrictive element. The ejection of liquid droplets of each ink composition is preferably carried out by a recording head which ejects ink droplets through the utilization of mechanical action of a piezoelectric element.

Further, according to the present invention, there is also provided a recorded matter recorded by the above recording method.

EXAMPLES

The following Examples further illustrate the present invention. However, it should be noted that the present invention is not limited to these Examples.

Preparation of Ink Compositions

Ingredients were mixed together according to the formulations shown in Table 1, and the mixtures were filtered through a 10-μm membrane filter to prepare inks. The numerical values in the table represent the contents (% by weight) of respective ingredients in the inks.

TABLE 1

| | | Yellow ink composition | | | | Magenta ink composition | |
|---|---|---|---|---|---|---|---|
| Ink No. | | Y1 | Y2 | Y3 | Y4 | M1 | M2 |
| Yellow pigment | C.I. PY 213 | 5.50 | — | — | — | — | — |
| | C.I. PY 74 | — | 5.50 | — | — | — | — |
| | C.I. PY 128 | — | — | 5.50 | — | — | — |
| | C.I. PY 110 | — | — | — | 5.50 | — | — |
| Magenta pigment | C.I. PR 122 | — | — | — | — | 5.00 | — |
| | C.I. PR 202 | — | — | — | — | — | 5.00 |

TABLE 1-continued

|  |  | Yellow ink composition |  |  |  | Magenta ink composition |  |
|---|---|---|---|---|---|---|---|
| Ink No. |  | Y1 | Y2 | Y3 | Y4 | M1 | M2 |
| Cyan pigment | C.I. PB 15:3 | — | — | — | — | — | — |
|  | C.I. PB 15:4 | — | — | — | — | — | — |
| Orange pigment | C.I. PO 43 | — | — | — | — | — | — |
|  | C.I. PO 64 | — | — | — | — | — | — |
|  | C.I. PO 71 | — | — | — | — | — | — |
| Green pigment | C.I. PG 7 | — | — | — | — | — | — |
|  | C.I. PG 36 | — | — | — | — | — | — |
| Dispersant |  | 1.40 | 1.40 | 1.40 | 1.40 | 1.30 | 1.30 |
| Glycerin |  | 15.00 | 15.00 | 15.00 | 15.00 | 16.00 | 16.00 |
| 1,2-Hexanediol |  | 5.00 | 5.00 | 5.00 | 5.00 | 5.00 | 5.00 |
| BYK-348 |  | 0.50 | 0.50 | 0.50 | 0.50 | 0.50 | 0.50 |
| Triethanolamine |  | 0.90 | 0.90 | 0.90 | 0.90 | 0.90 | 0.90 |
| Pure water |  | Balance | Balance | Balance | Balance | Balance | Balance |

Dispersant: Styrene-acrylic acid copolymer ammonium salt (molecular weight 7000, resin component 38%)

TABLE 2

|  |  | Cyan ink composition |  | Orange ink compostion |  |  | Green ink composition |  |
|---|---|---|---|---|---|---|---|---|
| Ink No. |  | C1 | C2 | Or1 | Or2 | Or3 | Gr1 | Gr2 |
| Yellow pigment | C.I. PY 213 | — | — | — | — | — | — | — |
|  | C.I. PY 74 | — | — | — | — | — | — | — |
|  | C.I. PY 128 | — | — | — | — | — | — | — |
|  | C.I. PY 110 | — | — | — | — | — | — | — |
| Magenta pigment | C.I. PR 122 | — | — | — | — | — | — | — |
|  | C.I. PR 202 | — | — | — | — | — | — | — |
| Cyan pigment | C.I. PB 15:3 | 4.00 | — | — | — | — | — | — |
|  | C.I. PB 15:4 | — | 4.00 | — | — | — | — | — |
| Orange pigment | C.I. PO 43 | — | — | 4.50 | — | — | — | — |
|  | C.I. PO 64 | — | — | — | 4.50 | — | — | — |
|  | C.I. PO 71 | — | — | — | — | 4.50 | — | — |
| Green pigment | C.I. PG 7 | — | — | — | — | — | 4.50 | — |
|  | C.I. PG 36 | — | — | — | — | — | — | 4.50 |
| Dispersant |  | 1.00 | 1.00 | 1.10 | 1.10 | 1.10 | 1.10 | 1.10 |
| Glycerin |  | 18.00 | 18.00 | 15.00 | 15.00 | 15.00 | 15.00 | 15.00 |
| 1,2-Hexanediol |  | 5.00 | 5.00 | 5.00 | 5.00 | 5.00 | 5.00 | 5.00 |
| BYK-348 |  | 0.50 | 0.50 | 0.50 | 0.50 | 0.50 | 0.50 | 0.50 |
| Triethanolamine |  | 0.90 | 0.90 | 0.90 | 0.90 | 0.90 | 0.90 | 0.90 |
| Pure water |  | Balance | Balance | Balance | Balance | Balance | Balance | Balance |

Dispersant: Styrene-acrylic acid copolymer ammonium salt (molecular weight 7000, resin component 38%)

Evaluation 1: Color Reproduction

The individual ink compositions thus obtained were combined as shown in Table 3 to constitute ink sets 1 to 10. For each ink set, specialty output patterns of 400 patches were printed with an ink jet printer PX-G900 (manufactured by Seiko Epson Corporation). For all the printed matters thus obtained, the calorimetric measurement of the patches was carried out, and the volume in a 3D space of $L^*a^*b^*$ was calculated. The Gumat volume determined by the calculation is dimensionless. The color reproduction was evaluated by the determined Gumat volume value according to the following criteria.

A: Not less than 830,000
B: Not less than 780,000 and less than 830,000
C: Not less than 730,000 and less than 780,000
D: Less than 730,000

The results of evaluation were as described in Table 3.

Evaluation 2: Lightfastness of Ink Sets

The ink compositions produced above were combined as shown in Table 3 below to constitute ink sets. For each ink set, specialty output patterns of 400 patches were printed in the same manner as in Evaluation 1. The printed matters thus obtained were introduced into a chamber in a lightfastness testing machine (a fluorescent lamp lightfastness testing machine, manufactured by Suga Test Instruments Co., Ltd.) and were allowed to stand in an environment of temperature 24° C. and humidity 60% for 40 days, followed by colorimetric measurement of all the patches in the printed matters to calculate the volume in a 3D space of $L^*a^*b^*$. The calculated Gumat volume is dimensionless. The retention rate was determined by equation (1), and, based on the results, the lightfastness was determined according to the following evaluation criteria. The fluorescent lamp lightfastness testing machine used consisted of 60 fluorescent lamps and can be used for an exposure test in which the illuminance of the printed face was regulated at 70,000 luxes.

$$\text{Retention rate} = [1 - \{(\text{Gumat volume }(A)\text{ calculated in Evaluation 1} - \text{Gumat volume }(B)\text{ calculated in Evaluation 2})/\text{Gumat volume }(A)\text{ calculated in Evaluation 1}\}] \times 100 \quad (1)$$

AA: Retention rate of not less than 95%
A: Retention rate of not less than 90%
B: Retention rate of not less than 80%
C: Retention rate of not less than 70%

The results of the evaluation were as described in Table 3.

TABLE 3

| Ink set | Ink composition | | | | | Color reproduction | | Lightfastness | | |
|---|---|---|---|---|---|---|---|---|---|---|
| | Yellow | Magenta | Cyan | Orange | Green | Gamut Volume, A | Evaluation | Retention rate Gamut Volume, B | (1 − (A − B)/ A) * 100 | Evaluation |
| 1 | Y1 | M1 | C1 | Or1 | Gr1 | 810,000 | B | 760,000 | 93.8 | A |
| 2 | Y1 | M1 | C1 | Or2 | Gr1 | 840,000 | A | 790,000 | 94.0 | A |
| 3 | Y1 | M1 | C1 | Or3 | Gr1 | 820,000 | B | 770,000 | 93.9 | A |
| 4 | Y1 | M1 | C1 | Or1 | Gr2 | 820,000 | B | 770,000 | 93.9 | A |
| 5 | Y1 | M1 | C1 | Or2 | Gr2 | 860,000 | A | 800,000 | 93.0 | A |
| 6 | Y1 | M1 | C2 | Or1 | Gr2 | 840,000 | A | 780,000 | 92.9 | A |
| 7 | Y1 | M2 | C1 | Or2 | Gr2 | 850,000 | A | 800,000 | 94.1 | A |
| 8 | Y2 | M1 | C1 | Or2 | Gr2 | 860,000 | A | 670,000 | 77.9 | C |
| 9 | Y3 | M1 | C1 | Or2 | Gr2 | 740,000 | D | 710,000 | 95.9 | AA |
| 10 | Y4 | M1 | C1 | Or2 | Gr2 | 750,000 | D | 730,000 | 97.3 | AA |

The invention claimed is:

1. An ink set for ink jet recording, comprising a cyan ink composition, a magenta ink composition, a yellow ink composition, a green ink composition and an orange ink composition, wherein
    the cyan ink composition comprises as a colorant at least one pigment selected from the group consisting of C.I. Pigment Blue 15 3 and C.I. Pigment Blue 15:4,
    the magenta ink composition comprises as a colorant at least one pigment selected from the group consisting of C.I. Pigment Red 122, C.I. Pigment Red 202, C.I. Pigment Red 209, and C.I. Pigment Violet 19,
    the yellow ink composition comprises as a colorant C.I. Pigment Yellow 213, the green ink composition comprises as a colorant at least one pigment selected from the group consisting of C.I. Pigment Green 7 and C.I. Pigment Green 36, and
    the orange ink composition comprises as a colorant at least one pigment selected from the group consisting of C.I. Pigment Orange 64, C.I. Pigment Orange 43, and C.I. Pigment Orange 71.

2. The ink set according to claim 1, wherein the concentration of the cyan pigment in the cyan ink composition and the concentration of the magenta pigment in the magenta ink composition are lower than the concentration of the yellow pigment in the yellow ink composition.

3. The ink set according to claim 1, wherein the concentration of the magenta pigment in the magenta ink composition is larger than the concentration of the cyan pigment in the cyan ink composition, and the concentration of the yellow pigment in the yellow ink composition is larger than the concentration of the magenta pigment in the magenta ink composition.

4. The ink set according to claim 1, wherein the concentration of the pigment in all the ink compositions is not more than 6% by weight, and the ratio among the concentration (% by weight) of the pigment in the cyan ink composition, the concentration (% by weight) of the pigment in the magenta ink composition, the concentration (% by weight) of the pigment in the yellow ink composition, the concentration (% by weight) of the pigment in the green ink composition, and the concentration (% by weight) of the pigment in the orange composition is pigment concentration of cyan ink composition:pigment concentration of magenta ink composition:pigment concentration of yellow ink composition:pigment concentration of green ink composition:pigment concentration of orange ink composition=2.0 to 5.0:2.5 to 5.5:3.5 to 6.0:2.0 to 5.0:2.0 to 5.0.

5. A method for ink jet recording, comprising ejecting droplets of an ink composition and depositing the droplets onto a recording medium to perform printing, wherein at least one ink composition contained in an ink set according to claim 1 is utilized as the ink composition.

6. A recorded matter printed by a method for ink jet recording according to claim 5.

* * * * *